(12) United States Patent
Nagamura et al.

(10) Patent No.: US 7,151,625 B2
(45) Date of Patent: Dec. 19, 2006

(54) SPATIAL OPTICAL MODULATION ELEMENT AND SPATIAL OPTICAL MODULATION METHOD

(75) Inventors: Toshihiko Nagamura, Fukuoka (JP); Ikuo Matsukura, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/411,805

(22) Filed: Apr. 27, 2006

(65) Prior Publication Data

US 2006/0193026 A1 Aug. 31, 2006

Related U.S. Application Data

(63) Continuation of application No. PCT/JP04/17964, filed on Dec. 2, 2004.

(30) Foreign Application Priority Data

Dec. 3, 2003 (JP) ............... 2003-404280

(51) Int. Cl.
*G02F 1/00* (2006.01)
*G02F 1/29* (2006.01)
*G02F 1/361* (2006.01)

(52) U.S. Cl. ............ 359/237; 359/299; 252/511; 252/582

(58) Field of Classification Search ........ 359/237, 359/245, 299, 321, 322; 252/500, 502, 511, 252/582; 345/87
See application file for complete search history.

(56) References Cited

U.S. PATENT DOCUMENTS

| 6,611,367 B1 | 8/2003 | Naya et al. ............ 359/299 |
| 7,094,367 B1 * | 8/2006 | Harmon et al. ............ 252/511 |

| 2006/0146388 A1 * | 7/2006 | Nagamura et al. ............ 359/237 |

FOREIGN PATENT DOCUMENTS

| JP | 05-273503 | 10/1993 |
| JP | 2002-258332 | 9/2002 |
| JP | 2003-121892 | 4/2003 |

OTHER PUBLICATIONS

Y.C.-Chen, et al., Applied Physics Letters, Ultrafast Optical Switching Properties of Single-Walled Carbon Nanotube Polymer Composites at 1.55 μm, vol. 81, No. 6, pp. 975-977, Aug. 5, 2002.
M. Ichida, et al., Physica B, Ultrafast Relaxation Dynamics of Photoexcited States in Semiconducting Single-Walled Carbon Nanotubes, No. 323, pp. 237-238 (2002).

(Continued)

*Primary Examiner*—Loha Ben
(74) *Attorney, Agent, or Firm*—Oblon, Spivak, McClelland, Maier & Neustadt, P.C.

(57) ABSTRACT

To provide a spatial optical modulation element having a long life free from a deterioration of optical modulation characteristics even if a high power laser beam with an ultra-short pulse is used as a modulation drive light, and having a high response speed when e.g. a light having a wavelength of 1.55 μm is used.

A spatial optical modulation element wherein disposed between a prism 2 and an optical functional material layer 3 made of an optical functional material with the complex index of refraction changeable by light irradiation, is a low refractive index layer 4 made of a transparent material with a refractive index lower than the refractive index of the prism 2, and carbon nanotubes are used as the optical function material.

10 Claims, 1 Drawing Sheet

OTHER PUBLICATIONS

Satoshi Tatsuura, et al., Advanced Materials, Semiconductor Carbon Nanotubes as Ultrafast Switching Materials for Optical Telecommunications, vol. 15, No. 6, pp. 534-537, Mar. 17, 2003.

Toshihiko Nagamura, et al., Polymer Preprints, Japan, Ultrafast All-Optical Light Modulation in Guided Mode Thin Films by Photoinduced Complex Refractive Index Changes upon Femtosecond Laser Excitation, vol. 52, No. 12, pp. 3430 and 3431, Sep. 10, 2003.

Youichi Sakakibara, et al., Fullerene Nanotube Sogo Symposium Koen Yoshishu, Nonlinear Optical Property of Carbon Nanotubes and its Application as Saturable Absorbing Device for Optical Fiber Communication, vol. 25, pp. 6 and 7, Jul. 23-25, 2003.

Toshihiko Nagamura, et al., Symposium on Photo Chemistry, Ultrafast Spatial Light Modulation upon Femtosecond Laser Excitation of Guided Mode Thin Films, vol. 2001, p. 229, Sep. 3, 2001, p. 229.

Y. -C. Chen, et al., Lasers and Electro-Optics 2002 (CLEO'02) Technical Digest Summaries, Ultrafast Optical Switch Properties of Single-Wall Carbon Nanotube Polymer Composites at 1.55 µm, vol. 1, p. 660, May 19-24, 2002.

Yo-Sakakibara, et al., AIST Today, Carbon Nanotube o Hikari Tsushin ni Hikari Switch e Aratana Michi o Hiraku, vol. 2, No. 12, pp. 10 and 11, Dec. 1, 2002.

Yoichi Sakakibara, et al., Dai 50 Kai Oyo Butsurigaku Kankei Rengo Koenkai Koen Yokoshu, Saturable Absorption of Semiconductor Single Wall Carbon Nanotube at Optical Telecommunication Wavelengths, p. 548, Mar. 2003.

Satoshi Tatsuura, et al., Dai 50 Kai Oyo Butsurigaku Kankei Rengo Koenkai Koen Yokoshu, Semiconductor Carbon Nanotubes as Ultrafast Switching Materials for Optical Telecommunications, p. 547, Mar. 2003.

Toshihiko Nagamura, et al., Symposium on Photochemistry, High Speed Reflection Type All-Optical Modulation Based on Guided Mode Thin Films Containing Indium Phthalocyanine Derivatives, vol. 2002, p. 425, Sep. 4, 2002.

Iori Yoshida, et al., Bulletin of the Research Institute of Electronics, Intensity Modulation Based on Photoinduced Complex Refractive Index Changes in Guided Mode Photoelectrochromic Polymer Thin Films Upon Femtosecond Excitation, Shizuoka University 35, pp. 9 to 15, Nov. 9, 2000.

U.S. Appl. No. 11/366,470, filed Mar. 3, 2006, Nagamura et al.

* cited by examiner

SPATIAL OPTICAL MODULATION ELEMENT AND SPATIAL OPTICAL MODULATION METHOD

TECHNICAL FIELD

The present invention relates to a spatial optical modulation element to be used for e.g. display devices or optical information treatment devices, and a spatial optical modulation method. Particularly, it relates to a spatial optical modulation element using as a layer reflecting a to-be-modulated light, a layer made of a low refractive index material instead of a conventional metal layer, and using a layer made of an optical functional material for which carbon nanotubes are essential instead of an optical functional material layer containing a colorant. Further, it relates to a spatial optical modulation method whereby the useful life is long, the modulation response sensitivity is high and optical modulation at a high speed is made possible by using the spatial optical modulation element to reflect or confine by a waveguide mode the to-be-modulated light.

BACKGROUND ART

Heretofore, as a spatial optical modulation element employing a surface plasmon resonance, an element has been known wherein on one side of a prism, a metal layer and an optical functional film made of a material with the refractive index changeable by light irradiation (which may be referred to also as a colorant-containing film) are laminated. This element has been reported such that a to-be-modulated light is permitted to enter through the prism and confined or reflected by the metal film, and when it emerges from the prism, a modulation drive light is irradiated to the optical functional film, as the case requires, so that the condition for controlling the to-be-modulated light is changed by ON/OFF of the modulation drive light to make high speed optical modulation practically possible (e.g. patent Document 1 to 3).

Carbon nanotubes have been known to be useful as an is optical functional material. Further, it has been reported that carbon nanotubes have high speed optical response characteristics and the characteristics can be obtained at a wavelength region of from 1 to 2 µm (e.g. patent Document 4 and Non-patent Documents 1 to 3).

Patent Document 1: JP-A-5-273503
Patent Document 2: U.S. Pat. No. 6,611,367
Patent Document 3: JP-A-2002-258332
Patent Document 4: JP-A-2003-121892
Non-patent Document 1: Y. C. Chen et al, Applied Physics Letters, 81, p. 975-977 (2002)
Non-patent Document 2: M. Ichida et al, Physica B, 323, p. 237-238 (2002)
Non-patent Document 3: S. Tatsuura et al, Advanced Materials, 15, p. 534-537 (2003)

DISCLOSURE OF THE INVENTION

Problems that the Invention is to Solve

The conventional spatial optical modulation element has a problem such that if a high power laser beam with an ultra-short pulse such as femtosecond laser is employed as the modulation drive light, the metal layer will be damaged, and the optical modulation characteristics of the to-be-modulated light are likely to deteriorate. Further, it also has a problem such that the life of the element tends to be short.

The present invention has been made in view of the above situation, and it is an object of the present invention to provide a spatial optical modulation element having a long life free from a deterioration of the optical modulation characteristics even if a high power laser beam with an ultra-short pulse is used as the modulation drive light, and having a high response speed when e.g. a light having a wavelength of 1.55 µm is employed.

Means of Solving the Problems

The present invention provides a spatial optical modulation element characterized in that disposed between a dielectric layer and an optical functional material layer made of an optical functional material with the complex index of refraction changeable by light irradiation, is a low refractive index layer made of a transparent material with a refractive index lower than that of the dielectric, and the optical functional material layer is a layer made of an optical functional material for which carbon nanotubes are essential.

In the spatial optical modulation element of the present invention, the dielectric layer is a layer made of a dielectric, and is preferably a layer made of a transparent dielectric. The transparent dielectric may, for example, be a dielectric material such as optical glass (e.g. BK7), quartz glass, high refractive index glass or polycarbonate.

The optical functional material layer is preferably a layer made of carbon nanotubes or a layer made of carbon nanotubes and another material. The another material is preferably a transparent material with a refractive index lower than the refractive index of the dielectric in the present invention. Such a transparent material may be the same as or different from the transparent material to be used for formation of the low refractive index layer. Further, the optical functional material layer is preferably a layer made of carbon nanotubes and the same transparent material as the transparent material forming the low refractive index layer. The carbon nanotubes are preferably single-walled carbon nanotubes.

The low refractive index layer is preferably made of an organic material, particularly preferably made of a fluororesin. The fluororesin is preferably a non-crystalline fluoropolymer having no C—H bond.

The present invention further provides a spatial optical modulation method characterized in that using a spatial optical modulation element wherein disposed between a dielectric layer and an optical functional material layer made of an optical functional material with the complex index of refraction changeable by light irradiation, is a low refractive index layer made of a transparent material with a refractive index lower than that of the dielectric, and the optical functional material layer is a layer made of an optical functional material for which carbon nanotubes are essential, at the interface between the dielectric and the low refractive index layer, reflection of a to-be-modulated light entering through the dielectric, is controlled by a modulation drive light.

In the spatial optical modulation method of the present invention, the control of the reflection of the to-be-modulated light by the modulation drive light is carried out preferably by a combination of reflection of the to-be-modulated light and confinement of the to-be-modulated light by a waveguide mode.

Effects of the Invention

The spatial optical modulation element of the present invention is provided with a transparent low refractive index layer instead of a conventional metal layer and is designed so that the to-be-modulated light is reflected at the interface between the dielectric layer and the low refractive index layer, and a modulation drive light is irradiated to the optical functional material as the case requires to carry out modulation and control of the to-be-modulated light by ON/OFF of the modulation drive light, whereby the damage which the element will receive by the to-be-modulated light and the modulation drive light irradiated to the optical functional material layer, will be reduced, and it will be possible to obtain an element which is excellent in durability and has a long life and which is operable constantly over a long period of time even when a high power laser beam such as a femtosecond laser beam is employed.

Particularly by using carbon nanotubes as the optical functional material, it will be possible to obtain a spatial optical modulation element having a high response speed when a light in a near infrared wavelength region such as a light having a wavelength of 1.55 µm is employed. Namely, it will be possible to design an optical circuit having high speed response characteristics employing an optical system employed in the existing communication system as it is.

Further, by the construction provided with a transparent low refractive index layer instead of a metal layer, the reflectance of the to-be-modulated light will be changed with a high sensitivity by ON/OFF of the modulation drive light, and the modulation response sensitivity becomes very high. As a result, modulation at a higher speed becomes possible, and it becomes possible to realize a spatial optical modulation element having a response speed of a picosecond order.

Further, by the construction provided with a transparent low refractive index layer instead of a metal layer, the incident angle and the output angle of the to-be-modulated light will be large, whereby generation of noises due to leakage and detection of the modulation drive light on the output side, will be reduced.

MEANINGS OF SYMBOLS

1,7 ... Spatial optical modulation element, 2 ... prism (dielectric), 3 ... optical functional material layer, 4 ... low refractive index layer, 5 ... to-be-modulated light, 6 ... modulation drive light, 8 ... slide glass (dielectric)

BEST MODE FOR CARRYING OUT THE INVENTION

Figure 1:
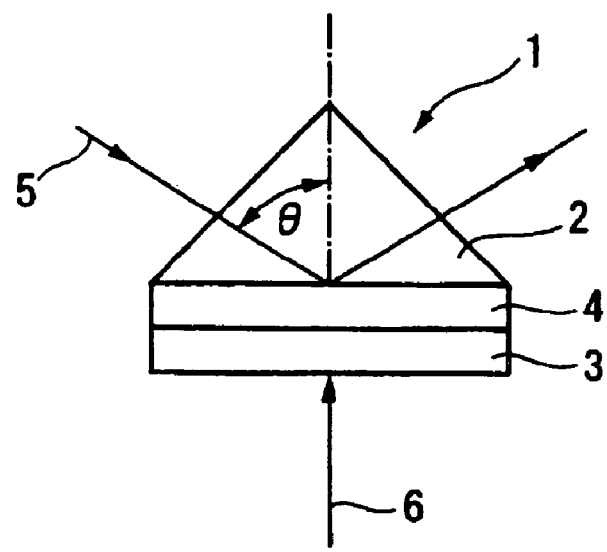
FIG. 1 is a view schematically showing a first embodiment of the spatial optical modulation element of the present invention.

FIG. 1 is a view showing a first embodiment of the spatial optical modulation element of the present invention. This spatial optical modulation element 1 comprises a prism 2 (dielectric) made of a dielectric, an optical functional material layer 3 made of an optical functional material with the refractive index changeable by light irradiation and, disposed between the prism and the optical functional material layer 3, a low refractive index layer 4 made of a transparent material with a refractive index (n2) lower than the refractive index (n1) of the dielectric constituting the prism 2, and is constructed so that at the interface between the prism 2 and the low refractive index layer 4, reflection of a to-be-modulated light 5 entering through the prism 2, is controlled by a modulation drive light 6.

In the present invention, the form of the dielectric layer to let the to-be-modulated light 5 enter, is not limited to the form of such a prism 2 and may be other form such as a plate form, a thick plate form or a block form. It is preferred to employ a prism 2 having a triangular cross section, since it is thereby possible to easily construct a structure wherein on its first surface the low refractive index layer 4 and the optical functional material layer 3 are laminated, and from another surface of the prism 2, the to-be-modulated light 5 is permitted to enter, and from the other surface of the prism 2, the reflected light is permitted to come out.

This prism 2 is made of a dielectric which is transparent to the wavelength of the to-be-modulated light 5. The dielectric is particularly preferably one made of a material having a refractive index within a range of from 1.4 to 3 to the wavelength of the to-be-modulated light. Specifically, optical glass (e.g. BK7), quartz glass, high refractive index glass or polycarbonate may, for example, be mentioned. The difference in refractive index between the prism 2 and the low refractive index layer 4 (n1–n2) is preferably within a range of from 0.05 to 0.9.

The material constituting the above low refractive index layer 4 may be any material so long as it is a transparent material with the refractive index (n2) being smaller than the refractive index (n1) of the dielectric constituting the prism 2 (i.e. having a relation of n2<n1). However, it is preferably an inorganic material or organic material having good light resistance to the wavelength of the to-be-modulated light. As such an inorganic material, a fluoride crystal or a fluorine-added quartz glass may, for example, be mentioned. As such an organic material, a fluororesin may, for example, be mentioned.

The low refractive index layer 4 made of an inorganic material may be formed by e.g. a sputtering method, a CVD method or a vapor deposition method. Whereas, the low refractive index layer 4 made of an organic material may be formed by e.g. a method of spin coating a resin solution. From the merits such as the production costs and the production efficiency, as the low refractive index layer 4 to be used for the spatial optical modulation element of the present invention is preferably a layer made of an organic material, particularly a fluororesin.

The thickness of this low refractive index layer 4 is within a range of from 100 to 1,000 nm, preferably from 200 to 1,000 nm, more preferably from 300 to 800 nm. The thickness of the low refractive index layer is preferably changed depending upon the wavelength of the to-be-modulated light to enter into the spatial optical modulation element of the present invention. Usually, when the thickness of the low refractive index layer 4 is within the above range, modulation of the to-be-modulated light 5 may be carried out satisfactorily, and it is possible to obtain sufficient durability and thereby to obtain a spatial optical modulation element 1 having a long life.

In a suitable embodiment of the present invention, the low refractive index layer 4 is preferably made of a fluororesin.

Further, such a fluororesin is preferably made of a non-crystalline fluoropolymer having no C—H bond. Such a fluoropolymer has a C—F bond (i.e. a carbon-fluorine bond) instead of a C—H bond.

As a fluoropolymer, a tetrafluoroethylene resin, a perfluoro(ethylene/propylene) resin, a perfluoroalkoxy resin, a vinylidene fluoride resin, an ethylene/tetrafluoroethylene resin or a chlorotrifluoroethylene resin may, for example, be used. However, such fluororesins have crystallinity, whereby scattering of light is likely to result, the transparency is likely to be poor, and fusion or the like may result when irradiated with the modulation drivel light 6, and thus the durability may be poor.

Whereas, a non-crystalline fluoropolymer is free from scattering of light by crystals and thus is excellent in transparency. The fluoropolymer is not particularly limited so long as it is a non-crystalline fluoropolymer having no C—H bond. However, a fluoropolymer having a cyclic structure in its main chain is preferred. As such a fluoropolymer having a cyclic structure in its main chain, a fluoropolymer having a fluorinated aliphatic ring structure, a fluorinated imide ring structure, a fluorinated triazine ring structure or a fluorinated aromatic ring structure, is preferred. As the fluoropolymer having a fluorinated aliphatic ring structure, a polymer having a fluorinated aliphatic ether ring structure is more preferred.

The polymer having a fluorinated aliphatic ring structure is preferably a polymer obtainable by polymerizing a monomer having a fluorinated ring structure or a polymer having a fluorinated aliphatic ring structure in its main chain obtainable by cyclopolymerization of a fluorinated monomer having at least two (preferably two) polymerizable double bonds.

The polymer having a fluorinated aliphatic ring structure in its main chain obtainable by polymerization of a monomer having a fluorinated aliphatic ring structure, is known from JP-B-63-18964. Namely, a polymer having a fluorinated aliphatic ring structure in its main chain can be obtained by homopolymerization of a monomer having a fluorinated aliphatic ring structure such as perfluoro(2,2-dimethyl-1,3-dioxol), or by copolymerization of such a monomer with a radical polymerizable monomer such as tetrafluoroethylene, chlorotrifluoroethylene or perfluoro(methyl vinyl ether).

Further, the polymer having a fluorinated aliphatic ring structure in its main chain obtainable by cyclopolymerization of a fluorinated monomer having at least two polymerizable double bonds, is known from e.g. JP-A-63-238111 or JP-A-63-238115. Namely, a polymer having a fluorinated aliphatic ring structure in its main chain can be obtained by cyclopolymerization of a monomer such as perfluoro(allyl vinyl ether) or perfluoro(butenyl vinyl ether), or by copolymerization of such a monomer with a radical polymerizable monomer such as tetrafluoroethylene, chlorotrifluoroethylene or perfluoro(methyl vinyl ether).

Among the above polymers, a non-crystalline fluoropolymer having an aliphatic ring structure in its main chain and having no C—H bond, obtainable by cyclopolymerization of perfluoro(butenyl vinyl ether) may, for example, be CYTOP, tradename, manufactured by Asahi Glass Company, Limited (refractive index: 1.34).

Further, the polymer having a fluorinated aliphatic ring structure in its main chain can be obtained also by copolymerizing a monomer having a fluorinated aliphatic ring structure such as perfluoro(2,2-dimethyl-1,3-dioxol) with a fluorinated monomer having at least two polymerizable double bonds such as perfluoro(allyl vinyl ether) or perfluoro(butenyl vinyl ether).

As the above polymer having a fluorinated aliphatic ring structure, one having repeating units selected from the following formulae (I) to (IV) may specifically be exemplified. In the polymer having such a fluorinated aliphatic ring structure, some of fluorine atoms may be substituted by chlorine atoms.

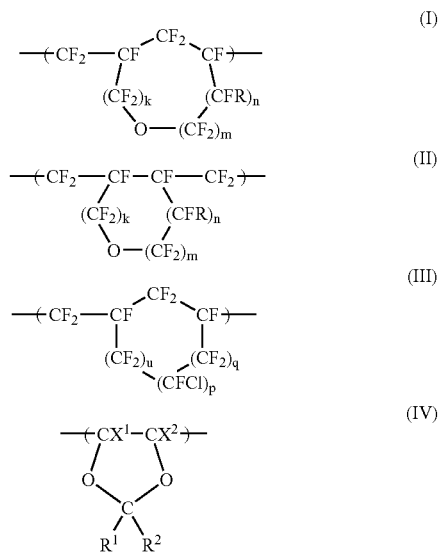

In the above formulae (I) to (IV), k is from 0 to 5, m is from 0 to 4, n is from 0 to 1, k+m+n is from 1 to 6, each of u, p and q which are independent of one another, is from 0 to 5, u+p+q is from 1 to 6, R is F or $CF_3$, $R^1$ is F or $CF_3$, $R^2$ is F or $CF_3$, $X^1$ is F or Cl, $X^2$ is F, Cl, $OR_f$ or $R_f$ (wherein $R_f$ is a $C_{1-3}$ perfluoroalkyl group).

The polymer having a fluorinated aliphatic ring structure is preferably a polymer having the ring structure in its main chain, and one containing at least 20 mol %, preferably at least 40 mol %, of repeating units having a ring structure, is preferred from the viewpoint of the transparency; mechanical properties, etc.

In the present invention, as the optical functional material, carbon nanotubes are essential. The carbon nanotubes are preferably single-walled carbon nanotubes from the viewpoint of response characteristics.

The carbon nanotubes are known to have a refractive index changeable by light irradiation, and they can be used as an optical functional material upon absorption of a light having a wavelength within a range of the ultraviolet-visible-near infrared region, particularly a light having a wavelength within a range of from 1 to 2 μm (more characteristically from 1.3 to 1.6 μm).

The spatial optical modulation element of the present invention can be used as an optical modulation element for the ultraviolet-visible-near infrared region. Namely, the spatial optical modulation element of the present invention is operable even by employing a light having a wavelength of 1.55 μm to be used for the existing optical communication. Further, the spatial optical modulation element of the present invention is operable also by employing a light in the ultraviolet-visible region, whereby high speed response characteristics can be obtained in the wavelength range used for the communication. Further, the transparent material which can be used for the spatial optical modulation element of the present invention means a material transparent at a wavelength of a light entering into the element i.e. a light in the ultraviolet-visible-near infrared region.

In the present invention, the optical functional material layer is a layer made of an optical functional material for which carbon nanotubes are essential. It may be either a layer made of only carbon nanotubes or a layer made of carbon nanotubes and another material, preferably the latter layer. The former layer may be a layer having carbon nanotubes laminated. Further, the latter layer is preferably a layer made of carbon nanotubes and a transparent material, and preferably a layer having carbon nanotubes incorporated in a transparent material. The layer having carbon nanotubes incorporated in a transparent material is preferably a layer wherein carbon nanotubes are uniformly dispersed in a transparent material.

The transparent material which forms the optical functional material layer may be the same as or different from the transparent material used for the transparent material layer to be disposed between the dielectric layer and the optical functional material layer. Further, the transparent material is preferably a material with substantially no absorption particularly in a near infrared region.

Further, where the refractive index of the optical functional material layer is n3, the relation between n3 and the refractive index (n2) of the low refractive index layer preferably satisfies n3≧n2, more preferably n3>n2. Particularly, the difference (n3−n2) in the refractive index between the optical functional material layer and the low refractive index layer is preferably within a range of from 0.04 to 0.9.

As a specific example of the construction of the element of the present invention, an example may be mentioned wherein a dielectric layer and a low refractive index layer made of a specific transparent material are provided, and a layer made of the same specific transparent material containing carbon nanotubes is further provided to prepare an element. More particularly, an example may be mentioned wherein a low refractive index layer made of e.g. a transparent fluororesin is provided on a glass substrate, and a layer made of the same transparent fluororesin having carbon nanotubes dispersed therein is further provided.

It is particularly preferred to supply this transparent fluororesin in the form of a solution, since e.g. a spin coating method may be employed to provide the resin layer on the dielectric layer, and the carbon nanotubes can be easily dispersed in the resin. Further, as another specific example of the construction, an example may be mentioned wherein an element is prepared in the same manner as the above employing, as the transparent material containing carbon nanotubes, another transparent material (not limited to a fluororesin) different from the transparent material used for the low refractive index layer.

In the spatial optical modulation element 1 of the present invention, the thickness of the optical functional material layer 3 is within a range of from 100 to 1,000 nm, preferably from 150 to 1,000 nm, more preferably from 250 to 800 nm. When the thickness of the optical functional material layer 3 is within the above range, modulation of the to-be-modulated light 5 can be carried out satisfactorily, and adequate durability can be obtained, and it is possible to obtain a spatial optical modulation element 1 having a long life.

Now, the optical modulation operation characteristics of this spatial optical modulation element 1 will be described.

As an example for a method of carrying out optical modulation by using this spatial optical modulation element 1, an example as shown in the drawing may be mentioned. In FIG. 1, the low refractive index layer 4 and the optical functional material layer 3 are laminated on one surface of the prism 2 which has a triangular cross section and a to-be-modulated light 5 is permitted to enter from a surface other than the lamination surface of the prism 2. The to-be-modulated light 5 is reflected at the interface between the prism 2 and the low refractive index layer 4 when the incident angle θ is within a prescribed range and comes out from the other surface of the prism 2. The range of the incident angle θ at that time is preferably within a range of from 40° to 85°. It is particularly preferably adjusted to an angle at which a waveguide mode will be formed when the optical functional material layer 3 is irradiated with the modulation drive light 6 and the to-be-modulated light 5 is confined. The wavelength of the to-be-modulated light 5 to enter into the prism 2 is not particularly limited.

When the optical functional material layer 3 of this spatial optical modulation element 1 is irradiated with the modulation drive light 6, as the case requires, the extinction coefficient (k) of the optical functional material layer 3 will increase. By the increase of this extinction coefficient (k), the above-mentioned reflectance of the to-be-modulated light 5 will be sharply changed, and modulation of the to-be-modulated light 5 coming out from the prism 2 will be carried out by ON/OFF of the modulation drive light 6. In a case where the to-be-modulated light 5 is permitted to enter at an angle to meet the angle at which the waveguide mode will be formed when the optical functional material layer 3 is irradiated with the modulation drive light 6 and the to-be-modulated light 5 will be confined, at the time of OFF when no irradiation by the modulation rive light 6 is carried out, the reflectance of the to-be-modulated light 5 will not be changed, and almost all incident light will be reflected at the interface between the prism 2 and the low refractive index layer 4 and comes out from the exit surface of the prism 2. On the other hand, when the optical functional material layer 3 is irradiated with the modulation drive light 6 (at the time of ON), the extinction coefficient (k) of the optical functional material layer 3 will be increased, and by the increase of this extinction coefficient (k), the reflectance of the to-be-modulated light 5 will be sharply lowered, whereby the to-be-modulated light 5 coming out from the exit surface of the prism 2 sharply becomes weak or substantially extinct. Here, the sharp drop in the reflectance of the to-be-modulated light 5 is due to the fact that a standing wave is formed as a waveguide mode inbetween from the interface between the prism 2 and the low refractive index layer 4 to the low refractive index layer 4 or the optical functional material layer 3, and consequently, no reflection becomes observable. Accordingly, optical switching or intensity modulation of the to-be-modulated light 5 is possible by ON/OFF of the modulation drive light 6.

The change in the reflectance caused by the ON/OFF switching of the modulation drive light 6 is at most 0.2 picosecond at the time of ON and at most 1 picosecond at the time of OFF, and thus, by this spatial optical modulation element 1, extremely high speed optical modulation becomes possible.

This spatial optical modulation element 1 is provided with the transparent low refractive index layer 4 instead of a conventional metal layer and is designed so that the to-be-modulated light 5 is reflected at the interface between the prism 2 and the low refractive index layer 4, and the optical functional material layer 3 is irradiated with the modulation drive light 6, as the case requires. Namely, modulation of the to-be-modulated light 5 is carried out by ON/OFF of the modulation drive light 6. Thus, the damage which the element receives by the to-be-modulated light 5 and the modulation drive light 6 irradiated to the optical functional material layer 3, will be reduced, and it will be possible to obtain an element which is operable constantly for a long period of time even when a high power laser beam such as a femtosecond laser beam is employed and which is excellent in durability and has a long life.

Further, by the construction provided with the transparent low refractive index layer 4 instead of the is metal layer, the reflectance of the to-be-modulated light 5 will be changed with a high sensitivity by ON/OFF of the modulation drive light 6, the modulation response sensitivity becomes extremely high, modulation at a higher speed becomes possible, and it becomes possible to realize a spatial optical modulation element having a response speed of pico second order.

Further, by the construction provided with the transparent low refractive index layer 4 instead of the metal layer, the incident angle and the output angle of the to-be-modulated light 5 become large, whereby generation of noises caused by leakage and detection of the modulation drive light 6 on the output side can be reduced.

Figure 2:
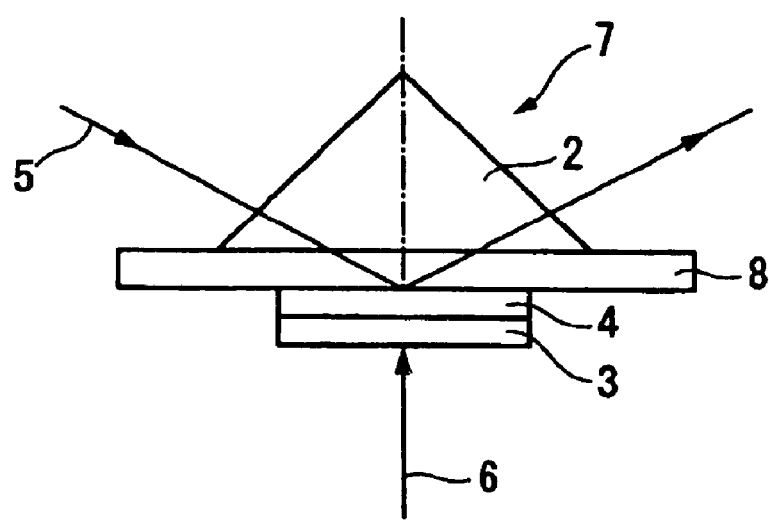
FIG. 2 is a view schematically showing a second embodiment of the spatial optical modulation element of the present invention.

FIG. 2 is a view showing a second embodiment of the spatial optical modulation element of the present invention. This spatial optical modulation element 7 comprises substantially the same constituting components as the spatial optical modulation element 1 according to the first embodiment shown in FIG. 1, and the same constituting components are identified by the same symbols. The difference of this spatial optical modulation element 7 from the spatial optical modulation element 1 according to the first embodiment is that a slide glass 8 having the same refractive index (n1) as the prism 2, is employed, and the low refractive index layer 4 and the optical functional material layer 3 are laminated on one side of this slide glass 8, and the prism 2 is fixed on the other side of this slide glass 8, so that the to-be-modulated light 5 entering from the prism 2 is reflected at the interface between the slide glass 8 and the low refractive index layer 4. The prism 2 and the slide glass 8 are preferably fixed via a matching solution or a transparent resin adhesive having the same refractive index as their materials.

With the spatial optical modulation element 7, it is possible to carry out high speed modulation of the to-be-modulated light 5 by ON/OFF of the modulation drive light 6 in the same manner as the spatial optical modulation element 1 according to the first embodiment shown in FIG. 1, and it is possible to obtain the same effects as the spatial optical modulation element 1 according to the first embodiment. Further, the spatial optical modulation element 1 is one wherein the low refractive index layer 4 and the optical functional material layer 3 are laminated on one side of the slide glass 8, whereby it is easy to form the low refractive index layer 4 and the optical functional material layer 3 by e.g. a spin coating method, and it is easy to produce the spatial optical modulation element.

As another embodiment, an example may be mentioned wherein the spatial optical modulation element is constructed by using a diffraction grating instead of the prism.

INDUSTRIAL APPLICABILITY

According to the present invention, it is possible to provide a spatial optical modulation element which is capable of being operated constantly for a long period of time even if a high power laser beam with an ultra-short pulse such as a femtosecond laser beam is used and which is excellent in the durability and has a long life. Further, high speed response characteristics will be obtained even for an existing light source at a wavelength of from 1.3 to 1.6 µm.

The entire disclosure of Japanese Patent Application No. 2003-404280 filed on Dec. 3, 2003 including specification, claims, drawings and summary is incorporated herein by reference in its entirety.

What is claimed is:

1. A spatial optical modulation element characterized in that disposed between a dielectric layer and an optical functional material layer made of an optical functional material with the complex index of refraction changeable by light irradiation, is a low refractive index layer made of a transparent material with a refractive index lower than that of the dielectric layer, and the optical functional material layer is a layer made of an optical functional material for which carbon nanotubes are essential.

2. The spatial optical modulation element according to claim 1, wherein the transparent material forming the low refractive index layer is an organic material.

3. The spatial optical modulation element according to claim 1, wherein the transparent material forming the low refractive index layer is a fluororesin.

4. The spatial optical modulation element according to claim 1, wherein the transparent material forming the low refractive index layer is a non-crystalline fluoropolymer having no C—H bond.

5. The spatial optical modulation element according to claim 1, wherein the optical functional material layer is a layer made of carbon nanotubes and a transparent material with a refractive index lower than that of the dielectric layer, and the transparent material is the same as or different from the transparent material forming the low refractive index layer.

6. The spatial optical modulation element according to claim 1, wherein the optical functional material layer is made of carbon nanotubes and the same material as the transparent material forming the low refractive index layer.

7. The spatial optical modulation element according to claim 1, wherein the carbon nanotubes are single-walled carbon nanotubes.

8. The spatial optical modulation element according to claim 1, wherein the dielectric layer is a layer made of a transparent material.

9. A spatial optical modulation method characterized in that using a spatial optical modulation element wherein disposed between a dielectric layer and an optical functional material layer made of an optical functional material with the complex index of refraction changeable by light irradiation, is a low refractive index layer made of a transparent material with a refractive index lower than that of the dielectric layer, and the optical functional material layer is a layer made of an optical functional material for which carbon nanotubes are essential, at the interface between the dielectric layer and the low refractive index layer, reflection of a to-be-modulated light entering through the dielectric layer, is controlled by a modulation drive light.

10. The spatial optical modulation method according to claim 9, wherein the control of the reflection of the to-be-modulated light by the modulation drive light is carried out by a combination of reflection of the to-be-modulated light and confinement of the to-be-modulated light by a waveguide mode.

* * * * *